O. SCHALLER.
STOP COCK OR VALVE FOR VACUUM PIPE SYSTEMS.
APPLICATION FILED MAY 13, 1910.

1,060,791.

Patented May 6, 1913.

Witnesses:

Inventor:
OTTO SCHALLER,
by H. van Dedem
Attorney.

UNITED STATES PATENT OFFICE.

OTTO SCHALLER, OF SÜDENDE, NEAR BERLIN, GERMANY.

STOP-COCK OR VALVE FOR VACUUM PIPE SYSTEMS.

1,060,791. Specification of Letters Patent. Patented May 6, 1913.

Application filed May 13, 1910. Serial No. 561,158.

*To all whom it may concern:*

Be it known that I, OTTO SCHALLER, a subject of the German Emperor, and residing at Südende, near Berlin, German Empire, have invented a new and useful Improved Stop-Cock or Valve for Vacuum Pipe Systems, of which the following is a description.

In my U. S. Patent No. 1,003,068, dated September 12, 1911, I have described a stop-cock or valve for vacuum conduits in which the cock or valve is entirely inclosed in an evacuated chamber or housing. By this means the cock or valve may be easily rendered absolutely tight because it will only have to close tightly against the difference of the vacuum in the conduits and that in the chamber, which difference is relatively small.

The present invention relates to a further development of this device and consists substantially in locating the evacuated space or chamber inside the closing organ for the high vacuum pipe system by which means it is enabled to combine the closing or cut-off member for the high vacuum conduit with the stopper for the vacuum space of the lower vacuum.

In the accompanying drawings two embodiments of the invention are illustrated in vertical section.

Figure 1:
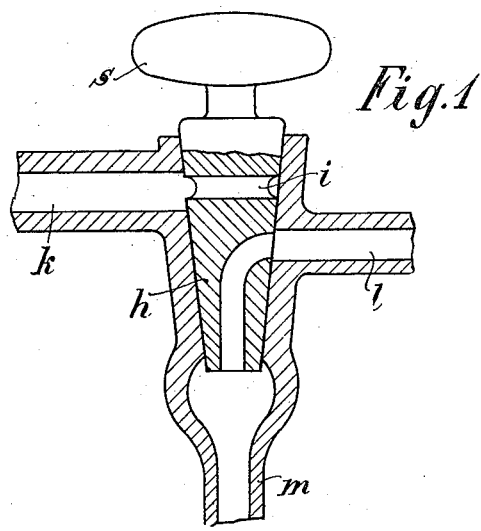
Figure 2:
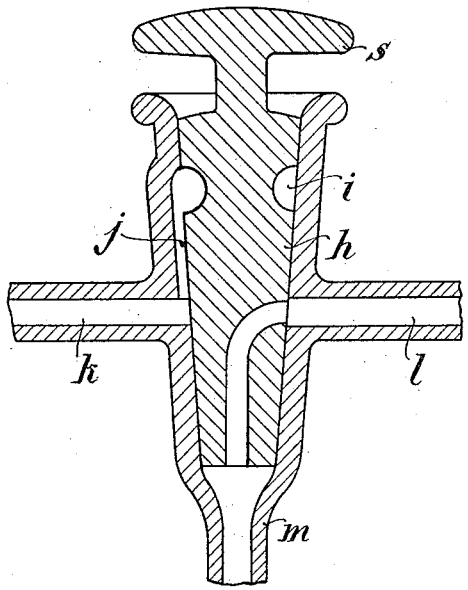

Figure 1 represents a through-way stop cock for a high vacuum conduit constructed according to the present invention, and Fig. 2 shows a three-way cock constructed on the same principle.

Referring first to Fig. 1, the plug housing is provided with a conduit $k$ for the lower vacuum, a conduit $l$ for the high vacuum and a conduit $m$ leading to the receptacles to be evacuated. The high vacuum pipe $l$ may be connected to the conduit $m$ by means of a suitable boring $h'$ in the plug $h$ of the cock. The latter is formed in one piece with a stopper $s$ and is provided with an annular groove $i$ on a level with the low vacuum pipe $k$. The operation of this groove $i$ is similar to that of the evacuated chamber of my patent above mentioned, viz., it serves to prevent the outer air from penetrating to the high vacuum conduit $l$. As shown in Fig. 2 this groove $i$ might be connected up to the low vacuum pipe $k$ by means of a recess or port $j$. It will be readily understood that the annular groove might be formed in the housing instead of the plug. In Fig. 2 the three-way cock is illustrated and the pipe $k$ is located opposite the high vacuum pipe $l$ in the housing, so that by means of the boring $h'$ both the high vacuum pipe $l$ and the low vacuum pipe $k$ may be placed into connection with the pipe $m$ leading to the receptacles to be evacuated. It will be evident that another angular boring might be provided in the plug so that the cock could serve as a multiple way cock.

From the foregoing specification it will readily be seen that in the present case also it is only necessary to render the cock tight as between the high vacuum and the low vacuum, not, however, as between the high vacuum and the outer air. The groove $i$ is always in communication with the low vacuum space.

It will be clear that an annular groove similar to $i$ could be arranged below the pipe $k$ as well as above the same and connected to it by a channel or port extending upwardly.

I claim as my invention:—

1. In a cock for vacuum conduits, the combination of a housing having a main opening and a plurality of vacuum conduits; and a plug in said opening and provided with a passage adapted to connect together certain of said conduits; an annular groove being provided in one of the faces of contact between the plug and housing and communicating with one of said conduits.

2. In a cock for vacuum conduits the combination of a housing having a central conical opening, and provided with lateral vacuum conduits and a terminal receptacle conduit; and a conical plug rotatably fitting in said opening and provided with a boring adapted to establish communication between the receptacle conduit and one of the vacuum conduits, said plug being also provided, at the end opposite said receptacle conduit, with an annular groove communicating with the other vacuum conduit.

3. In a cock for vacuum conduits, the combination of a housing having a central conical bore therein and provided with a high vacuum conduit and a low vacuum conduit opening through the side wall of the conical opening, and a receptacle conduit extending from the smaller end of said opening; and a conical plug rotatably fitted in said conical opening and provided with an L shaped boring adapted, at certain position of rotation of the plug, to establish communication between the high vacuum conduit and the receptacle conduit, the plug being also provided, near the end of the housing farthest from said receptacle conduit, with an annular groove communicating with said low vacuum conduit.

4. A cock for vacuum conduits comprising a housing having therein high and low vacuum passages and a conduit to the receptacles to be evacuated, a plug having means for establishing communication between said conduit and one of said passages, a low vacuum chamber being provided around said plug in constant communication with the low vacuum passage and located between the high vacuum passage and the outer air.

5. A cock for vacuum conduits comprising a housing having therein high and low vacuum passages located in different vertical planes, and a conduit to the receptacles to be evacuated, a plug in said housing having a port to establish communication between the high vacuum passage and the conduit to the receptacles to be evacuated and an annular chamber around the said plug in constant communication with the low vacuum passage and located between the high vacuum passage and the outer air.

6. A cock having a plug to establish communication between a high vacuum conduit and the receptacles to be evacuated, a low vacuum conduit to the said plug and an annular chamber around said plug in constant communication with said low vacuum conduit and located between the high vacuum conduit and the outer air.

In testimony whereof I affix my signature in the presence of two witnesses.

OTTO SCHALLER.

Witnesses:
 HENRY HASPER,
 WOLDEMAR HAUPT.